Dec. 29, 1925.
J. E. BROYLES
1,567,703
ANCHORAGE ASSEMBLY FOR AIRSHIPS
Filed Jan. 31, 1925     8 Sheets-Sheet 2
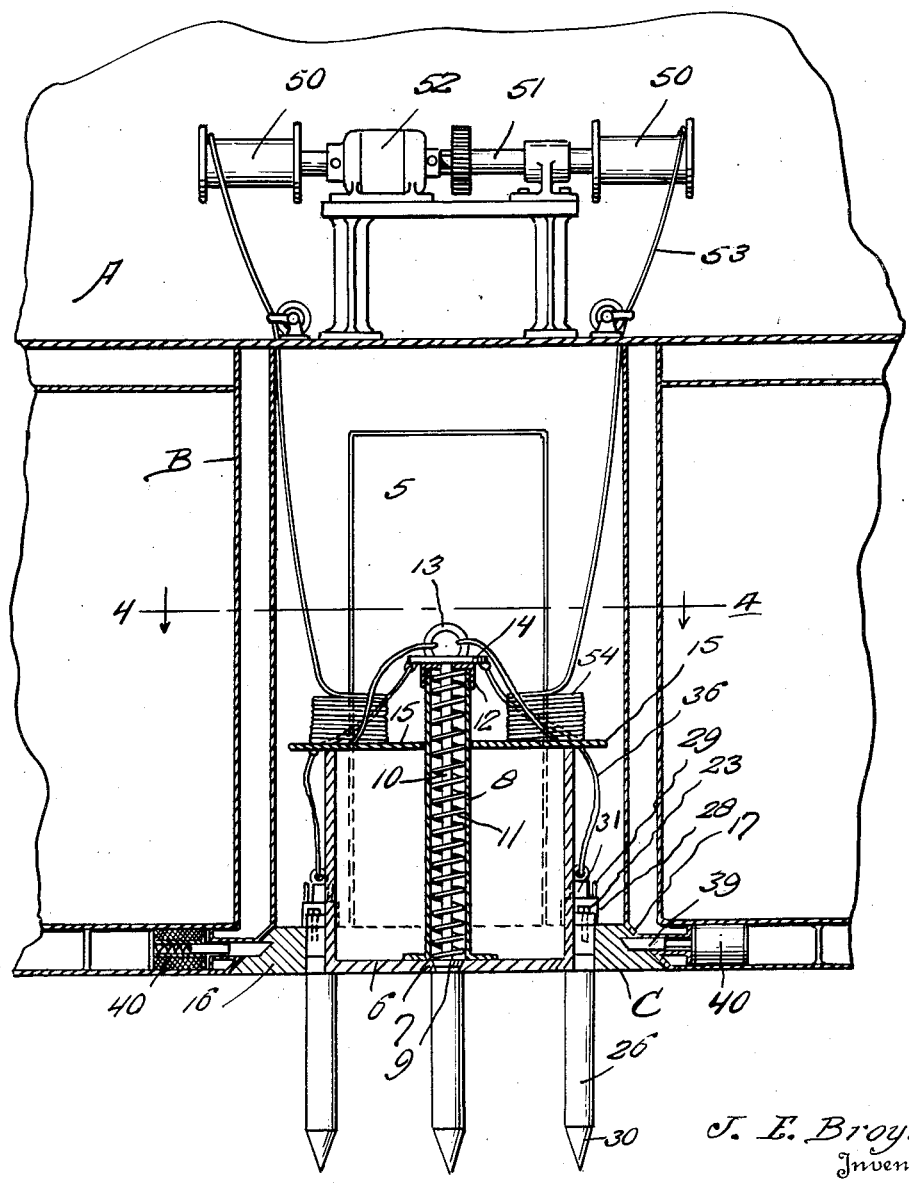

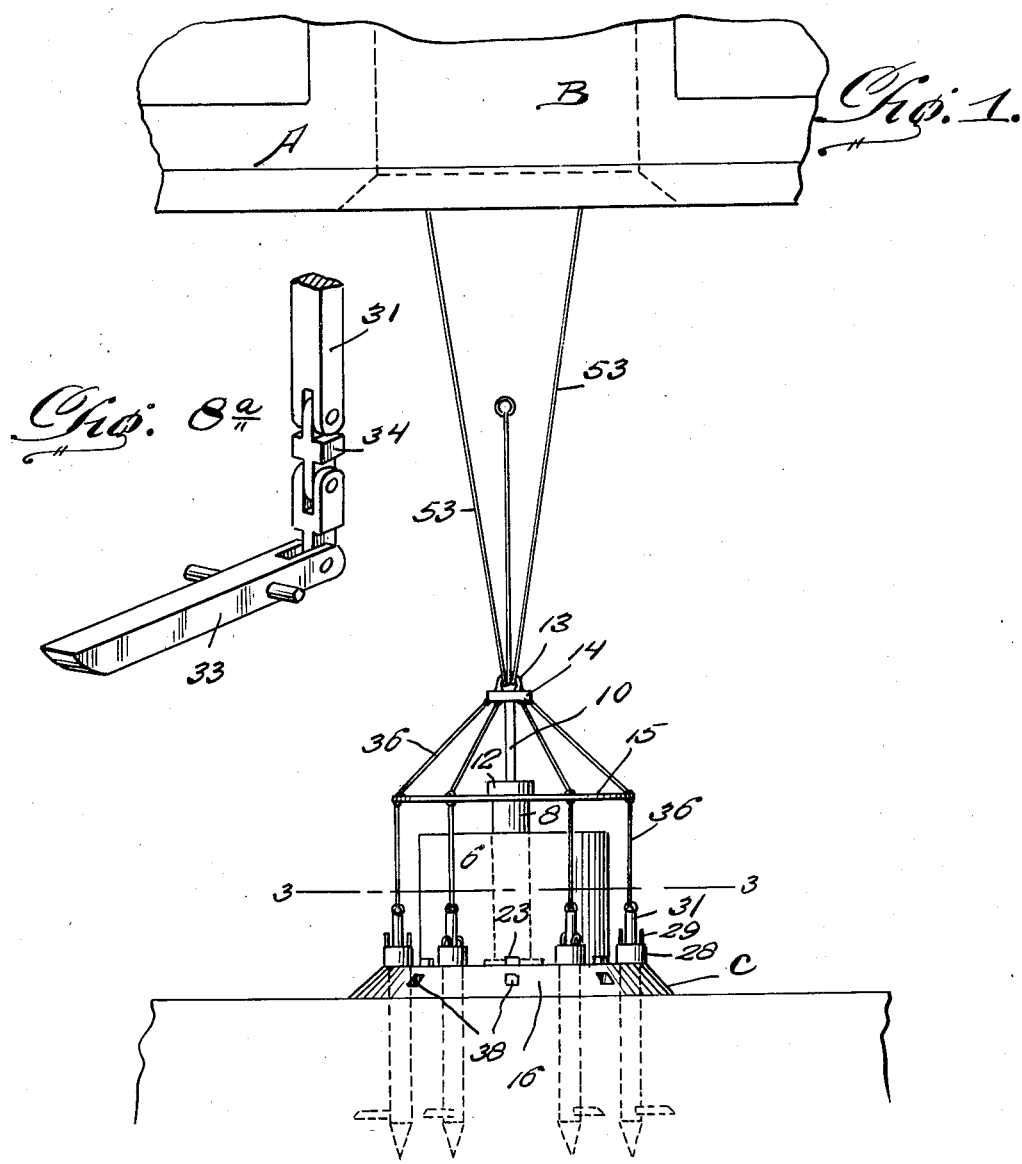

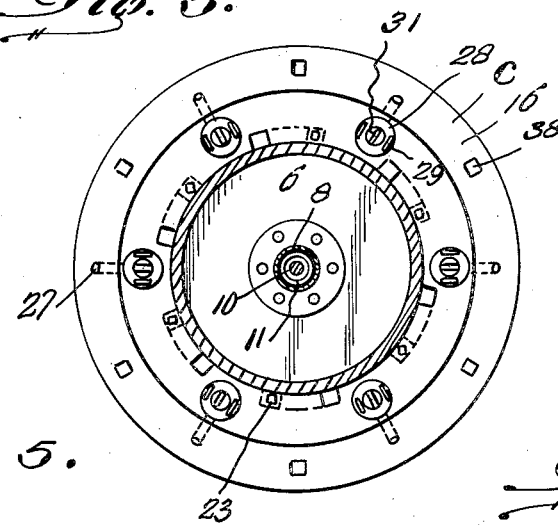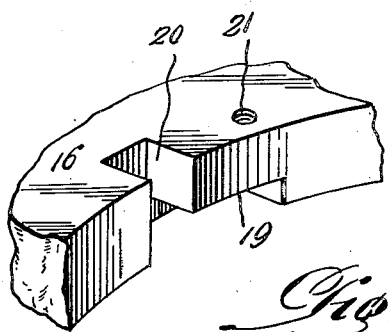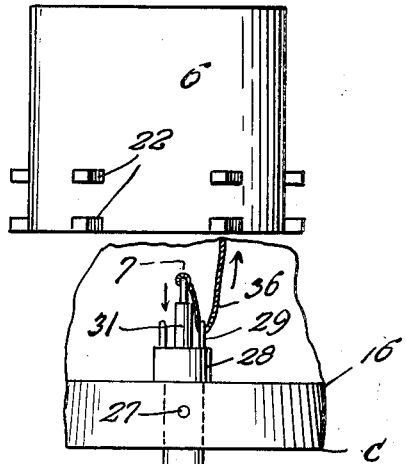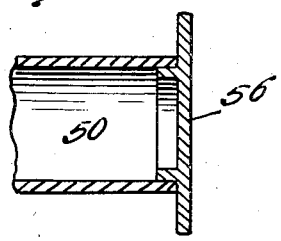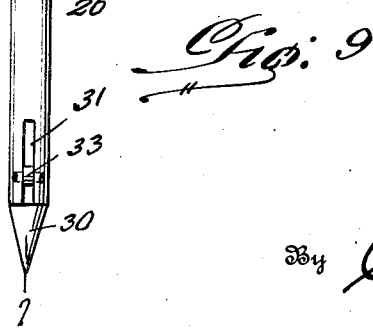

Dec. 29, 1925.  
J. E. BROYLES  
1,567,703  
ANCHORAGE ASSEMBLY FOR AIRSHIPS  
Filed Jan. 31, 1925  
8 Sheets-Sheet 4
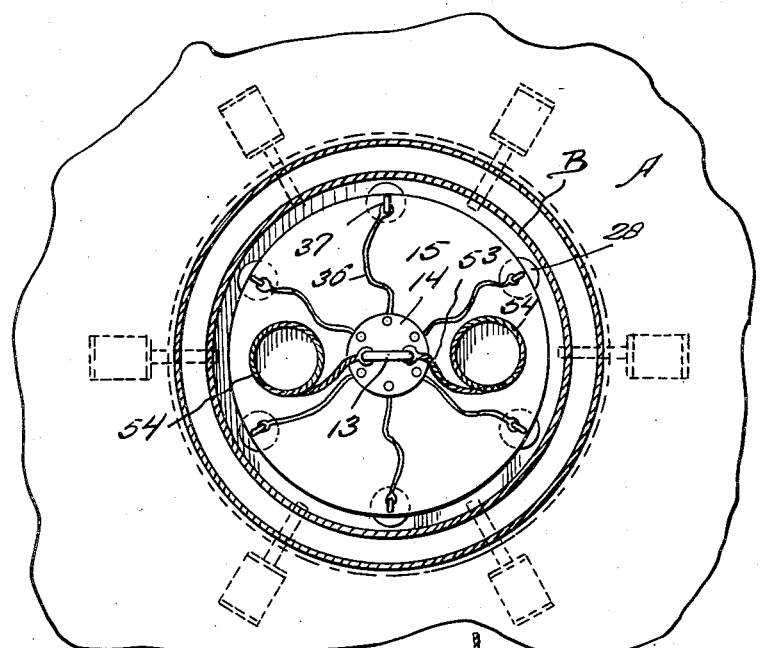
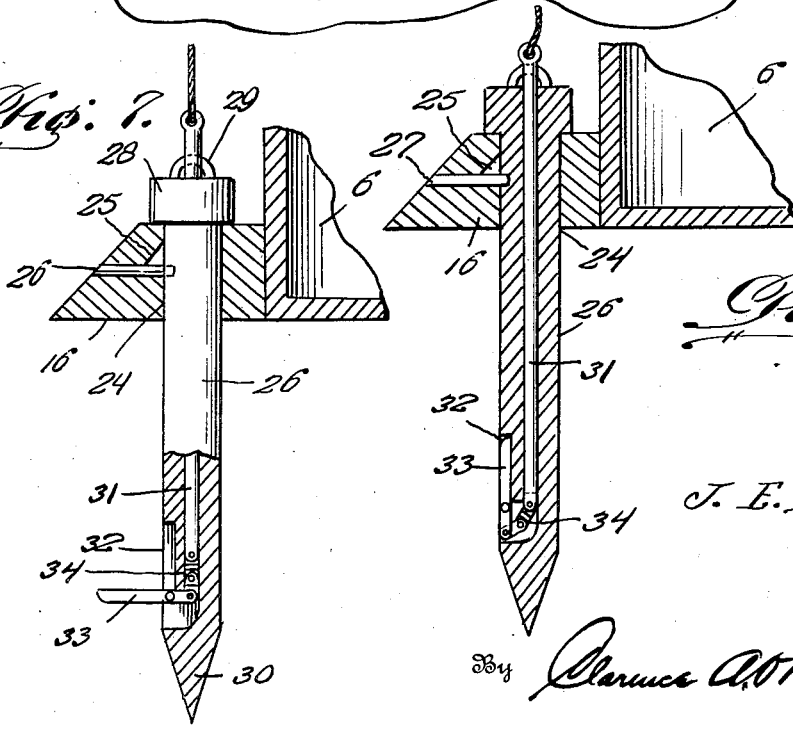
J. E. Broyles,
Inventor
By Clarence A. O'Brien
Attorney

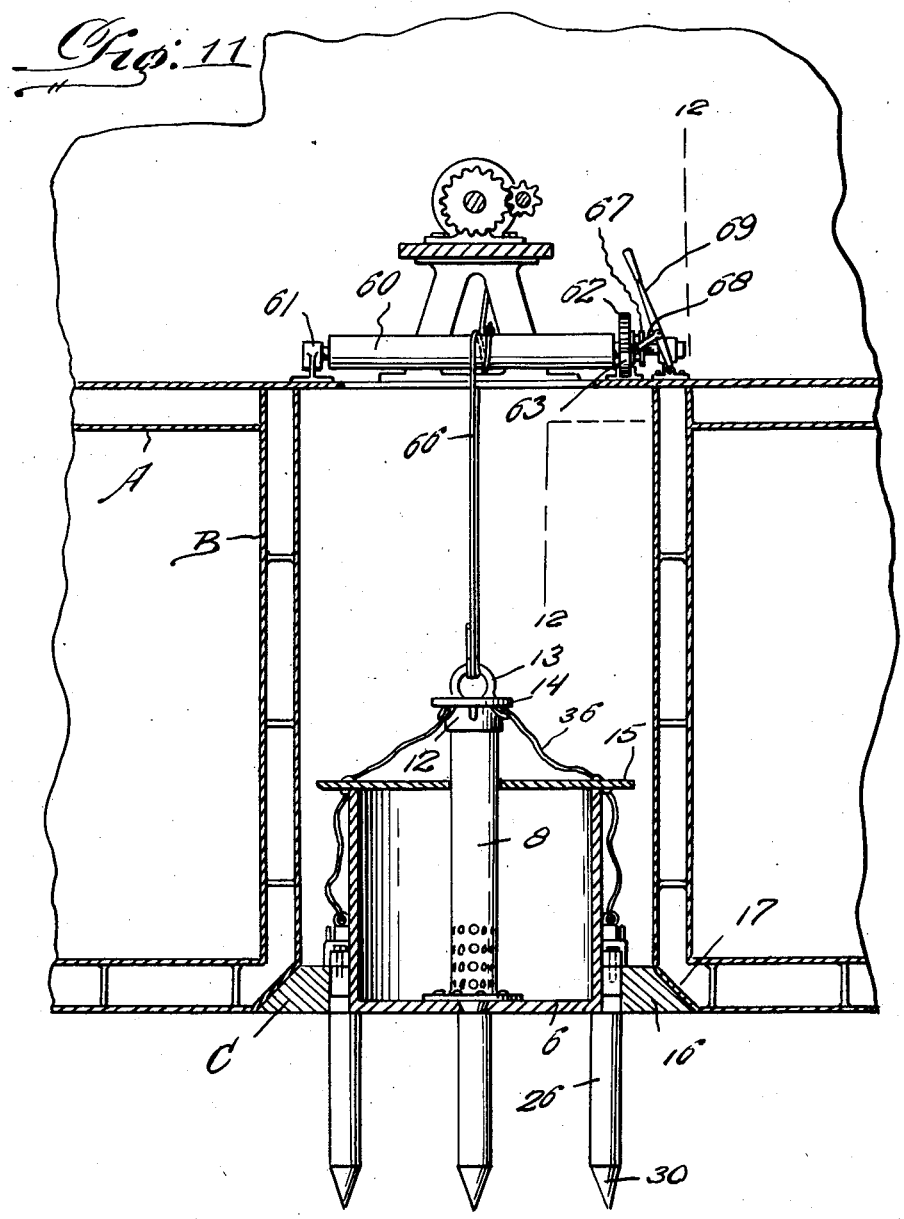

Dec. 29, 1925.
J. E. BROYLES
1,567,703
ANCHORAGE ASSEMBLY FOR AIRSHIPS
Filed Jan. 31, 1925     8 Sheets-Sheet 6
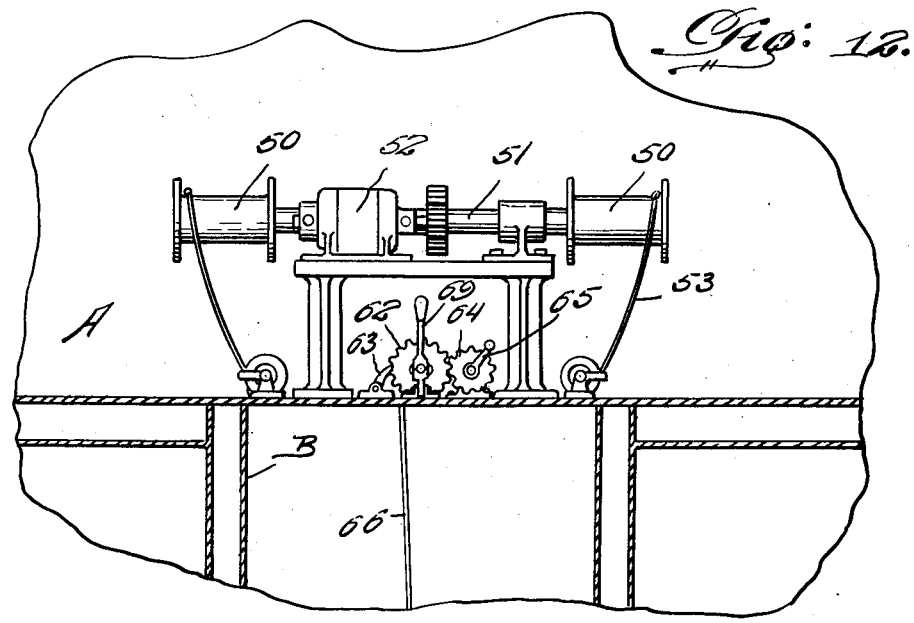
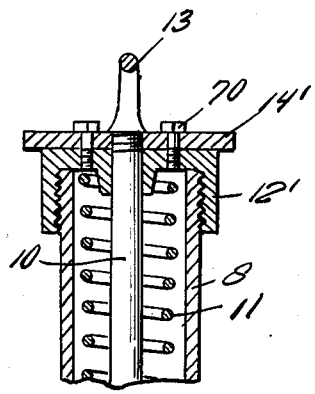
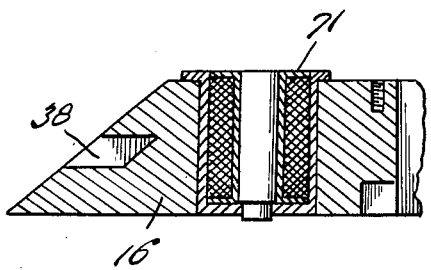
J. E. Broyles,
Inventor
By Clarence A. O'Brien
Attorney.

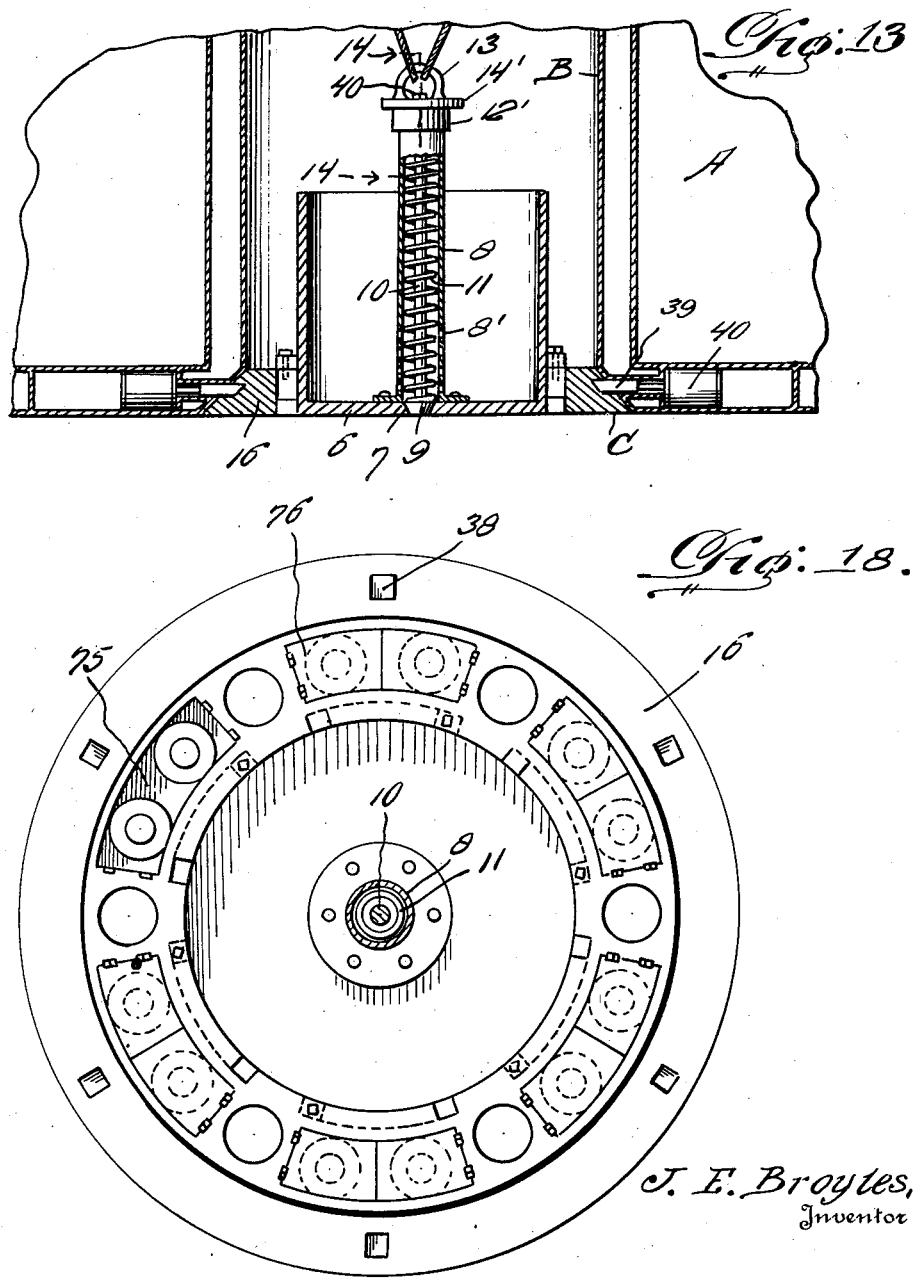

Dec. 29, 1925.  
J. E. BROYLES  
1,567,703  
ANCHORAGE ASSEMBLY FOR AIRSHIPS  
Filed Jan. 31, 1925 8 Sheets-Sheet 8
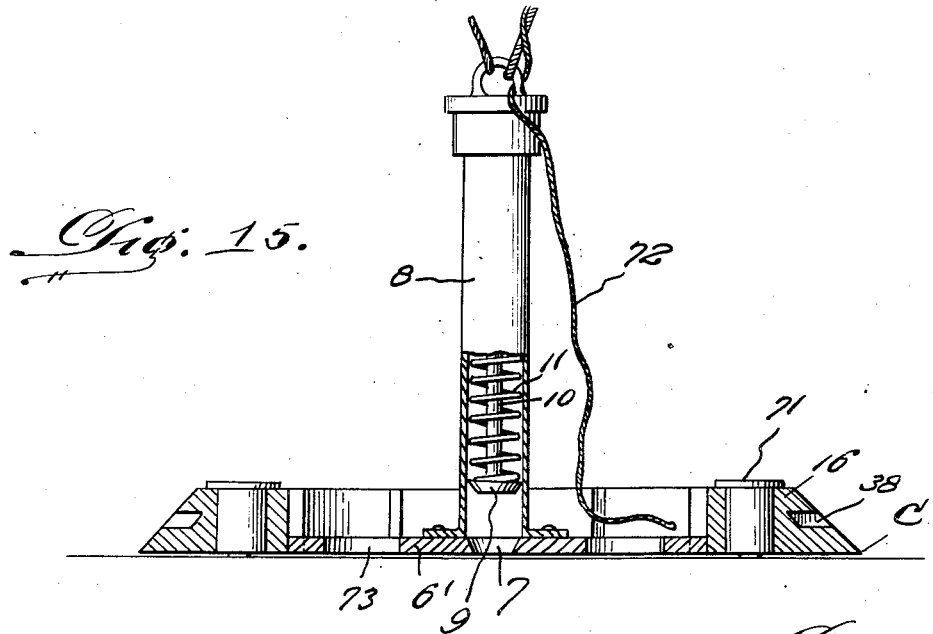
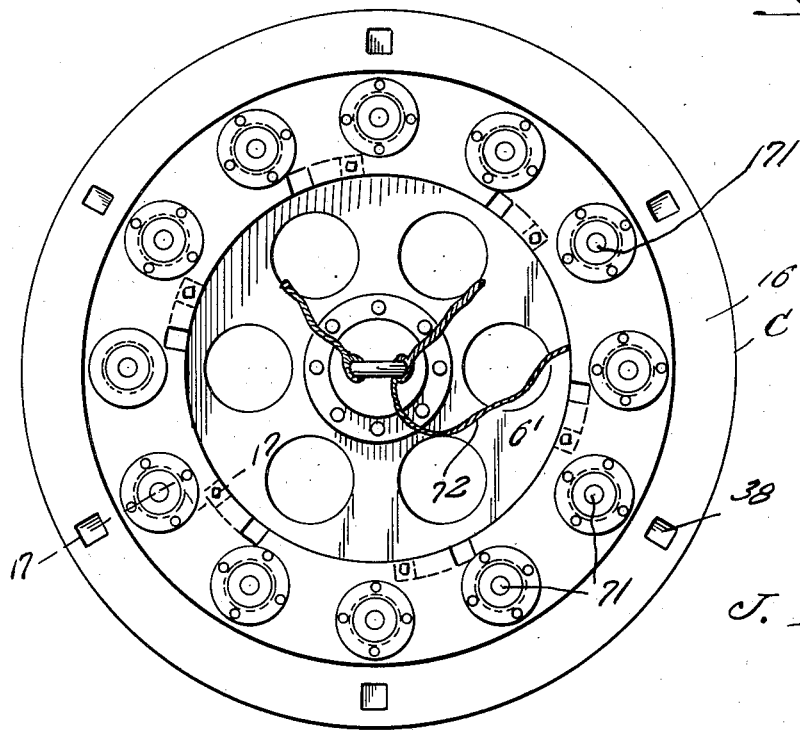
J. E. Broyles, Inventor
By Clarence A. O'Brien  
Attorney Patented Dec. 29, 1925.

1,567,703

UNITED STATES PATENT OFFICE.

JOHN ENLOE BROYLES, OF ENTIAT, WASHINGTON, ASSIGNOR OF ONE-HALF TO H. E. ROBERTSON AND T. H. WEILER, BOTH OF RUSSELLVILLE, MISSOURI.

ANCHORAGE ASSEMBLY FOR AIRSHIPS.

Application filed January 31, 1925. Serial No. 6,065.

*To all whom it may concern:*

Be it known that I, JOHN E. BROYLES, a citizen of the United States, residing at Entiat, in the State of Washington, have invented certain new and useful Improvements in an Anchorage Assembly for Airships, of which the following is a specification.

The present invention appertains to an anchorage assembly, designed particularly for use with dirigible airships and the like, and has for its prime object to enable such airships to land successfully at will, on either water, land, small buildings, or other places where landing would be desirable, without the aid of a field crew, mooring mast, or any outside help which would restrict landing to certain places.

Another very important object of the invention is to provide an apparatus of this nature which is capable of being easily incorporated in the airship structure, and which may be quickly and readily assembled and disassembled for repair purposes and the like.

Another very important object of the invention is to provide an apparatus of this nature which is easy to operate so as to obtain an anchoring connection between the landing place and the airship, and an apparatus whereby the airship may be successfully lowered to the landing place and afterward readily released therefrom.

A still further object of the invention is to provide an apparatus of this nature with a very simple, yet efficient structure, one which is reliable in operation, comparatively inexpensive to construct, strong, durable, not liable to readily get out of order, compact, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 is an elevation of an embodiment of the invention, showing the same in its extended position engaged with the ground.

Figure 2 is a vertical section through a portion of the apparatus, forming part of the airship, and showing the anchorage assemblage in its retracted or flying position.

Figure 3 is a horizontal section, taken substantially on the line 3—3 of Figure 1, looking downwardly.

Figure 4 is another horizontal section, taken substantially on the line 4—4 of Figure 2, looking in the direction of the arrows.

Figure 5 is a detail elevation, showing particularly the cup shaped member of the anchor, and one of the stakes.

Figure 6 is a detail perspective of a portion of the ring of the hanger.

Figure 7 is a detail view, partly in section, taken substantially on the line 7—7 of Figure 9.

Figure 8 is a similar view, showing the stop arm retracted.

Figure 8$^a$ is a detail perspective view of the stop arm.

Figure 9 is a fragmentary longitudinal section, through one end of the cable drum.

Fig. 10 is a part-sectional view of one of the winch drums, showing the removable end.

Figure 11 is a vertical section through the structure forming part of the airship with a slightly modified form of the hanger.

Figure 12 is a detail section, taken substantially on the line 12—12 of Figure 11, looking to the left.

Figure 13 is a sectional view, through the structure forming part of the airship showing the anchorage assemblage designed for water.

Figure 14 is a detail section, taken on an enlarged scale, substantially on the line 14—14 of Figure 13.

Figure 15 is a detail view, partly in section, showing a modified form of the anchor for engagement with roofs of buildings.

Figure 16 is a top plan view thereof.

Figure 17 is a section, taken on an enlarged scale on line 17—17 of Figure 16, and Figure 18 is a top plan view of a modification showing another assemblage of the magnet in the anchor.

Referring to the drawings in detail, it will be seen that the portion of the airship which I have illustrated is indicated by the letter A, and has built therein a casing B, which is of a hollow cylindrical formation, extending vertically as is illustrated to advantage in Figure 2, and a door 5, of any preferred construction gives access thereto. The anchor proper is indicated generally by the letter C, and is adapted to be housed in this casing B, and shown to advantage in Figures 2, 11, and 13.

I have, in the accompanying drawings, illustrated several different embodiments of the invention, and as far as practicable, the same numerals of reference indicate similar parts throughout the several views.

Referring now particularly, to the embodiment shown in Figures 1 to 10, it will be seen that the cup shaped member 6 forms the core or inner structure of the anchor, being provided at its bottom with a central opening 7, from which rises a tube 8. A plunger or head 9 carried by a stem 10 is located in the tube 8, and fits on the opening 7, being held in this normal position by the coil spring 11. A cap 12 is fixed to the upper end of the tube 11, and the rod or stem 10 projects therethrough, terminating at its upper end in a ring 13, to which is attached an annular flange 14. A platform plate 15, of annular construction is slidable on the tube 8, normally resting on the upper edge of the core 6. A ring 16 is disposed about the bottom of the core 6, and is constructed with an outer bevelled edge adapted to fit snugly in a similar bevelled edge 17, at the bottom of the cylindrical casing B. The edge of the ring 16 is provided with recesses 19, arranged at spaced intervals on its bottom face and having notches 20, communicating therewith at one end, and threaded openings 21 communicating therewith at their other end. As is shown particularly in Figure 5, the core 6 is provided with a series of lugs 22, arranged in vertically spaced pairs, the lower ones of which may be inserted through the notches 20 of the ring 16, so that the pairs will straddle the portions of the rings above the recesses 19, the upper lugs 22 of the pairs registering with openings 21 and held in engagement therewith by bolts 23 or other suitable means. The ring 16 is provided with a series of holes 24, which are provided intermediate their ends with recesses 25 and stakes 26 extend through these openings. Stakes 26 are held in place by pins 27, preferably of wood, which pass through the bevelled edge of the ring 16, through the recesses 25, and have their ends terminated in the stakes 26.

Each stake 26 is preferably constructed with an elongated cylindrical shank, having a hinge 28 fixed on its upper end with a pair of eyes 29 adjacent its edges. The bottom end of the stake is pointed, as at 30, to aid it in penetrating into the ground. The shank of the stake is provided with a longitudinally extending bore through which is slidable a rod 31. A pocket 32 is formed on the outside of the shank of the stake, communicating at its outer end with the bore thereof, and a stop arm 33 is pivoted intermediate its ends at the bottom of the pocket 32 and the inner end thereof is connected to the rod 31, by means of the link 34. When the rod 31 is pushed downwardly in the stake, it will be seen that the stop arm will be housed in the pocket 32, as shown to advantage in Figure 8, but when the rod 31 is pulled upwardly or outwardly from the stake, the stop arm is projected transversely from the stake. A plurality of flexible members in the form of cables 36 are attached to the flange 14 and the stem 10, and pass through suitable openings in the platform plate 15, and are then attached to the ends of rods 31. Instead of passing the cables 36 through the platform plates 15, it is preferably to provide these cables in two sections, fastened at their inner ends to the plates, as at 37. The bevelled edge of the ring 16 is provided with a plurality of keeper openings 38 for the reception of bolts 39, forming part of armatures in solenoids 40, arranged adjacent the bevelled portion 14. In the present embodiment of the invention, now being described, a pair of drums are mounted to rotate with a shaft 51 operable by an electric motor 52 or in any other suitable manner. Cables 53 are attached at their ends to the drums 50 and are coiled at 54, so as to be neatly supported on the platform plate 15, and the ends of these cables are attached to the eyes 13 at the upper ends of the stems 10. The parts, as shown in Figure 2, are assembled for flying, and in order to drop the anchor, it is only necessary to retract the bolt 39 by energizing the solenoids 40, in any suitable and well known manner. When these bolts are released, of course, the ring 16 and other parts of the anchor C will drop because of their own weight, and the force created in this dropping will be sufficient to cause the stakes 26 to embed themselves in the ground when the same is struck. The electric motor 32 is then energized so as to cause rotation of the shaft 51 and drums 50, for winding the cables 53 thereabout. When the cables 53 first become taut, the stem 10 will be lifted and spring 11 tensioned, and therefore cables 36 will be pulled upon to actuate the stop arms to their projected positions, as shown in Figure 7, through the intermediacy of the links 34, which will effectively prevent the stakes from being withdrawn from the ground, so that as the drums 50 are further rotated, and the cables 53 further wound thereon, the airship will be slowly brought to the ground, until the bolts 39 again will lock into the keeper openings 38 of the ring 16.

When the air ship is thus positioned in its lower ground engaging position, the cables 26 below the plates 15 are disengaged from the ends of the rods 31 and brought under one of the eyes 29 on the heads 28, and then again attached to the rods 31 as shown to advantage in Figure 5. Therefore, when it is desired to release the anchor from the ground, the drums 50 are further rotated, which will cause the rods 31 to be moved downwardly, so as to swing the stop arms 33 into their respective pockets 32, and the airship is now free to lift the stakes out of the ground. As is shown to advantage in Figure 10, the ends 56 of the drum 50 are removable, in order that the coils of cables 53 may be easily removed therefrom and positioned on the platform plate 15, so that the anchor, after the cables 36 have been properly rearranged is ready to be dropped, as previously described.

In Figures 11 and 12, I have illustrated a modification of the embodiment just described, wherein the means utilized for holding the anchor C onto the casing D is different. The ring 16 in this modification is not provided with the keeper openings 38, but otherwise, the anchor is identical with the aforedescribed embodiment. The addition, in this modification, consists of a drum 60, journaled in suitable brackets 61, and having one end of its shaft squared, for slidably receiving a gear wheel 62, with which cooperates a pawl 63 for allowing rotation thereof in one direction only. A gear 64 operable by a hand crank 65, meshes normally with the gear wheel 62. By turning the crank 65, a cable 66 attached to the eye 13 of stem 10, may be wound about the drum 60, for holding the anchor in proper position at the lower end of the casing B without compressing the spring 11. A grooved collar 67 is formed on the gear wheel 62 and pins in ring 68 engage therewith and with the lever 69. By swinging the lever 69 so as to pull gear wheel 62 out of engagement with pawl 63 and gear 64, it will be seen that the anchor is free to drop, and when the stakes 26 are embedded in the ground, the gear wheel 62 may be placed back into its position, and the cable 66 partially rewound, sufficiently to compress the spring 11, and pull upon the cables 36, so as to pull the locking arms 33 outwardly, as previously described. The drums 50 may then be rotated, as previously described, for bringing the air ship down, and when in its down position, the cable 66 may be rewound on the drum 60 and locked in its wound position by the pawl 63.

In Figure 13, a further embodiment of the anchor is shown, which is held in place by substantially the same means as was disclosed in the first embodiment. This present embodiment of the anchor is for use over water, and includes the ring 16 and core 6, which here forms a bucket, and the opening 7 forms a valve seat, and the head or plunger 9 a valve. The tube 8 is perforated, as at 8'. As is shown in Figure 14, the cap 12' is threaded on the tube 8, and the flange 14' is engaged therewith by bolts 70, so that the stem 10 is fixed, so as to retain its valve 9 on the seat 7. When the solenoids 40 are energized to retract the bolts 39, the anchor C is free to drop, and of course, will sink in the water, thereby filling the cup-shaped core 6. By operation of the drums 50, the airship may be lowered as close to the water as desired, and the weight of the water in the core 6 will be sufficient to hold the anchor down. When it is desired to dump the water from the cup-shaped core 6, the bolts 70 are removed, and the cables 53 further wound on the drums 50, thereby lifting the valve 9 from its seat, so that the water may drain through the openings 8' and out of the cup shaped core.

In Figures 15 to 17 inclusive, I have illustrated a further embodiment of the invention, which is adapted for use in landing airships on buildings or the like, wherever a metallic surface is provided. In this embodiment of the invention, the anchor C is adapted to be held in the casing B by any of the means heretofore described. A plurality of electromagnets 71 are positioned in the ring in place of the stakes 26, and are capable of being energized in any suitable manner, such as through an electric conductor 72. In place of the core 6, a plate 6' is utilized, having suitable sight openings 73 therein, and the tube 8 is attached thereto in the same manner as it was attached to the bottom of the core 6. In this embodiment, the stem 10, spring 11, and head 9, merely acts as a shock absorbing means when the anchor is dropped. The anchor is dropped to the approximate distance and then slowly let down so as to rest on a roof or the like, and the electromagnets 71 are energized, and thus the airship may be drawn down by any of the means heretofore described. It is preferable to attach the ring 16 to the plate 6', in the same manner that the ring 16 is attached to the cup-shaped core 6. In Figure 18 I have shown a modification of the embodiment just described, wherein the electromagnets 71 are arranged in pairs, being positioned in compartments 75, over which may be closed lids 76. This arrangement of the electromagnets is convenient for repair purposes, allowing easy access thereto, when desired.

I think that the operation, advantages, and the structure of my invention will now be clearly understood without a more detailed description thereof. It is very apparent from the above that I have devised a very efficient means for anchoring airships, so as to greatly increase the usefulness thereof, by means of an apparatus which is possessed of a simple structure, which is thoroughly reliable, strong, durable, easy to manipulate, not liable to readily get out of order, and capable of being installed at a comparatively low cost. Although I have described the present embodiments of the invention with a considerable degree of particularity, it is to be understood that numerous changes in the details of construction, in the materials, in the combination and arrangement of parts, may be resorted to, without departing from the spirit or scope of the invention, as hereinafter claimed, or sacrificing any of its advantages.

Having thus described my invention, what I claim as new is:

1. An anchor for an apparatus of the class described including a ring, a core in the ring, stakes in the ring, ground engaging locking means associated with the stakes, and a releasing mechanism associated with said locking means.

2. An anchor for an apparatus of the class described including a ring, stakes in the ring, a core, a tube in the core, a plunger and stem slidable in the tube, a spring associated with the plunger and stem, a plate about the tube and resting on the core, cables attaching the stem to the winch drum, other cables extending from the plate attached to stem, to the anchor stakes, locking means in the stakes for holding them in engagement with the ground, also with ring in which assembled and a release mechanism associated with each of the stakes and connected to the other cables.

3. In combination, an airship having a cylindrical casing formed therein with its lower end open and beveled, and an anchor including a ring having a beveled periphery receivable in the beveled opening in the casing, object engaging means mounted on the ring, and releasable means associated with the anchor for holding the ring in the beveled end of the casing.

4. In combination, an airship having a cylindrical casing formed therein with its lower end open, and an anchor including a ring for reception in the lower open end in the casing, object engaging means mounted on the ring, and releasable means associated with the anchor for holding the ring in the open end of the casing.

In testimony whereof I affix my signature.

JOHN ENLOE BROYLES.